A blurb line across: United States Patent Office — 2,910,466 — Patented Oct. 27, 1959

2,910,466
PROCESS FOR PRODUCING CELLULOSE THIOURETHANES

William R. Watt, Newark, Del., assignor to American Viscose Corporation, Philadelphia, Pa., a corporation of Delaware No Drawing. Application February 6, 1956
Serial No. 563,427

13 Claims. (Cl. 260—216)

This invention is directed to an improved method of preparing cellulose thiourethanes.

Thiourethane derivatives of cellulose are of interest because they can be spun into filaments which show resistance to acid hydrolysis and will accept wool-type dyes. Although the preparation of cellulose thiourethanes is the subject of numerous patents, none of the patented methods has found commercial application, being generally characterized by long or complicated procedures which render them uneconomical and not readily adaptable to commercial exploitation. Most of the prior art processes (1) produce dark-colored thiourethanes which cannot be decolorized, or (2) require in their preparation, uneconomical reagents such as halogenated fatty acids or isothiocyanates.

A recent patent, U.S. 2,705,231, overcomes the difficulties just mentioned in that it produces colorless thiourethanes and eliminates the use of such reagents as isothiocyanates. That process comprises treating an aqueous solution of sodium cellulose xanthate with an aqueous solution of a salt of a di- or tri-valent metal which forms a complex with the sodium cellulose xanthate, thus precipitating the cellulose xanthate of said metal, washing the precipitate with water to remove water-soluble impurities, mixing the purified precipitate with an aqueous solution of an amine, separating the amine reaction product, and treating it with aqueous sulfuric acid to convert unreacted xanthate groups to hydroxyl groups. It would be desirable if a process along this general line could be developed which would eliminate the objections in the prior art processes mentioned above and at the same time simplify the process of U.S. 2,705,231.

Accordingly, it is one object of the invention to provide an improved method for the production of a cellulose thiourethane. A further object is a method of preparing such a product which is soluble in dilute alkali and can be made from the viscose normally used in the manufacture of rayon, thus eliminating the need for developing a special viscose. Another object is the provision of a method of preparing a cellulose thiourethane having the good properties of that described in U.S. 2,705,231 but which can be prepared in shorter time and at less expense.

These objects are achieved by the present invention. In accordance with this process sodium cellulose xanthate (viscose) is treated with a dilute acid to reduce its free alkali content, then treated with an aqueous solution of a salt of a di- or tri-valent metal which forms a complex with sodium cellulose xanthate, and the resulting reaction product is treated directly with a primary or secondary amine for several hours to produce the cellulose thiourethane. This is then separated, washed, and if desired, acid-treated to convert residual xanthate groups to hydroxyl groups.

The reaction between the sodium cellulose xanthate and a divalent metal salt to form a new metal cellulose xanthate may be represented as follows:

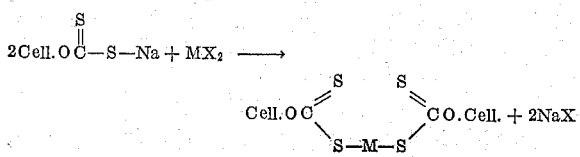

where Cell. represents the cellulose molecule, M represents the divalent metal, and X represents an anion. A trivalent metal will produce an analogous salt.

The metal cellulose xanthate is then reacted with an amine. The reaction may be represented thus:

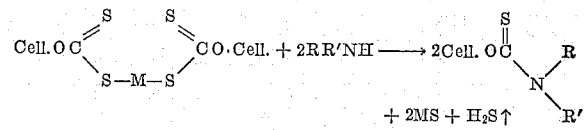

where R=H, alkyl, or aryl groups, and R'= alkyl or aryl group.

The parent cellulose xanthate from which the viscose solution is obtained preferably has the following composition: from 6–8% cellulose; from 4–8% sodium hydroxide, and from 35–100% of carbon disulfide (based on cellulose). Standard viscose contains about 36% $CS_2$. The viscose may be aged for from 1–80 hours prior to acid-treating it and reacting with the metal salt solution.

According to the provisions of U.S. Patent 2,705,231 diluted viscose is added to a solution of a metal salt. The metal cellulose xanthate is precipitated but is contaminated with metal hydroxides, metal trithiocarbonates and other metal salts. Some of these impurities are removed by washing the zinc cellulose xanthate with water, but the water-insoluble salts remain bound with the metal cellulose xanthate, being later converted to metallic sulfides which are difficult to separate from the desired cellulose phenylthiourethane. A reduction in the amount of metal salt used in precipitation of the metal cellulose xanthate would not only be desirable for the saving in cost of metal salt itself but would be desirable because of reduction in the amount of impurities mixed with the metal cellulose xanthate and subsequently with the cellulose thiourethane.

The metal salt is believed to fulfill two functions during precipitation of metal cellulose xanthate: (1) it removes free alkali from the viscose by precipitating the insoluble metal hydroxide

and, (2) it precipitates the metal cellulose xanthate

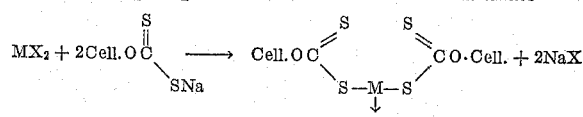

Relieving the metal salt of function (1) reduces the amount of metal salt used in the process and reduces the amount of insoluble metal hydroxide which precipitates along with the metal cellulose xanthate. As a further consequence, less metallic ion is present for conversion to metal sulfide. This simplifies the process of purifying the cellulose phenylthiourethane.

Partial neutralization of the viscose with an acid prior to addition of metal salt permits reduction in the amount of metal salt used in the precipitation of metal cellulose xanthate and results in less contamination of product with insoluble metal hydroxides and sulfides.

In practice, it has been found that the reaction between metal cellulose xanthate and amine proceeds best in slightly alkaline neutral, or slightly acid media (pH 5–9). Reaction may be possible at a higher or lower pH, although the degree of substitution of the product is diminished thereby. It is possible to reduce the pH of viscose to this range (5–9) by addition of sufficient acid; however, subsequent addition of metallic salt may cause a further reduction in pH, due to the fact that many metallic salts hydrolyze to give acidic solutions. Consequently, it is desirable to use just that amount of acid which, following addition of the metal salt, will give a solution of pH 5–7. Addition of the amine tends to raise the pH slightly. A good procedure is to add sufficient acid to reduce the pH of the viscose to 9–10. At this point the acid-base equilibrium is very close to the equivalence point, where addition of small amounts of acid causes a sharp decrease in pH. Addition of the metal salt then brings the pH into the range 5–7.

In practicing the invention the minimum permissible amount of metal salt for complete precipitation of metal cellulose xanthate is used. For example, 100 grams of viscose containing 7.4% cellulose would require 6–7 grams of $ZnSO_4.H_2O$. Unlike the process of U.S. 2,705,231 it is unnecessary here for the solution to contain a dehydrating agent such as sodium sulfate to "salt out" the metal cellulose xanthate complex. Various di- and tri-valent metals may be used in practicing the invention, and especially those from groups I, II, IV, and VIII of the periodic table, examples of which are zinc, cadmium, lead, nickel, iron, copper, and tin, zinc being preferred because that it yields a white product.

Unlike the process of U.S. 2,705,231, amine is added directly to the precipitating bath without filtering off and washing the metal cellulose xanthate. The amine may be a primary or secondary alkyl or aryl amine. Examples of suitable primary amines are aniline, ethylaniline, isopropylamine, amylamine, benzylamine, cyclohexylamine; allylamine, and octylamine. Examples of the secondary amines are dibenzylamine, dibutylamine, morpholine, and diethylamine. There may also be used diamines such as ethylenediamine, phenylenediamine, etc. Concentration of the amine is generally limited by its solubility in water. Degree of substitution of the product is dependent upon the amount of amine used, though there seems little point in adding more amine than can be dissolved in the given volume of water. In the case of aniline, e.g., the amine solution is a 3% solution of aniline in water.

Reaction can be carried out within a wide range of temperatures, but if conducted at lower temperatures more time (24–72 hours at 25° C.) is required. At temperatures above 50° C., a side reaction producing thioureas is favored.

Under the stated preferred conditions, cellulose thiourethanes are obtained which contain from about 0.4–2.5% nitrogen, the ratio of thiourethane groups to glucose units being from about 1:20 to 1:2.6.

The solubility of the cellulose thiourethane depends on whether a primary or secondary amine is used in the reaction. The products obtained using a primary amine are soluble in aqueous alkaline solutions, such as 3–8% solutions of sodium hydroxide, and in 12%–25% $NH_4OH$, whereas the products obtained using a secondary amine are insoluble in aqueous alkali, but soluble in cuprammonium hydroxide. The aqueous alkaline solutions can be formed into shaped articles by extruding them into saturated salt solutions such as ammonium sulfate or ammonium sulfate-containing solutions; these may also contain small amounts of an oxidizing agent such as sodium borate or the like. The low-water absorption and low cross-sectional swelling of these shaped articles, as for example fiber, suggest that during the spinning, links or bridges are formed between adjacent thiourethane groups. Cuprammonium solutions can be formed into shaped articles by extruding them into water or an aqueous acid solution.

By way of illustrating but in no way limiting the invention the following specific examples, in which parts are by weight unless otherwise indicated, are given:

*Example I*

Three hundred grams viscose (prepared, for example, by soaking 100 parts of cellulose in sheet form with 18% caustic soda at 18° C. for one hour, pressing to three times its own weight, shredding and mercerizing 55 hours at 18° C., xanthating with 36% $CS_2$ based on cellulose at 18–25° C. for 2–2½ hours, and then dissolving in sufficient dilute NaOH to give a viscose 7.4% in cellulose and 6.6% in NaOH) which had ripened 60 hours at 18° C. were diluted with 1500 ml. $H_2O$ and stirred 10–15 minutes at room temperature. Two hundred ten ml. of dilute (0.15 N) acetic acid were added dropwise with stirring. A solution of 20 grams of $ZnSO_4.H_2O$ in 200 ml. $H_2O$ was then added, whereupon a fibrous pale yellow precipitate formed. The mixture was stirred ten minutes at room temperature. Forty ml. aniline were added. Reaction mixture was raised to 40–45° C. and maintained at this temperature for four hours while stirring. At the end of this time, the fibrous residue was filtered off, washed twice with hot water, twice with hot isopropanol, and then treated with two liters of 10% $H_2SO_4$–20% $Na_2SO_4$ at 50° C. for 45 minutes. The precipitate was washed free of acid with warm water, washed once with acetone and air dried. The dried product was soft, white, fibrous. Five grams of this material dissolved readily in 100 cc. 3% NaOH, giving a colorless, transparent, viscous solution.

*Example II*

Three hundred grams of viscose prepared as in Example I and aged 60 hours at 18° C., was diluted with 750 ml. of distilled water. Dilute acetic acid (0.15 N) was added until pH was 9.8. An aqueous solution of $ZnSO_4$ was added until the pH was 6.5, and the resulting mixture was stirred 5–10 minutes. Forty cc. of aniline was added, the temperature raised to 40–45° C., and the reaction mixture maintained at this temperature for four hours with stirring. At the end of this time, the solid residue was filtered off, washed twice with hot (70–80° C.) water, once with hot isopropanol (60–70° C.) and then treated 45 minutes with a solution of 10% $H_2SO_4$ and 20% $Na_2SO_4$ at 50° C. The residue was filtered, washed free of acid, rinsed with acetone and air-dried.

*Example III*

Three hundred grams viscose prepared as in Example I but containing 85% $CS_2$ was mixed with 800 cc. of water and stirred until a homogeneous solution resulted. Two hundred ten cc. dilute acetic acid (100 cc. 99.5% $HC_2H_3O_2$, 1000 cc. of water) were added dropwise with stirring and the mixture stirred at 10–15 minutes. A solution of 20 grams $ZnSO_4.H_2O$ in 300 cc. water was added dropwise, forming a precipitate, and the mixture stirred 50–60 minutes. Fifty cc. of morpholine were added and the mixture immediately became very viscous; after 30–40 minutes of stirring the viscosity was reduced. Stirring was continued for four hours at room temperature during which time much foam formed on the surface and some product was lost through "sloshing" over the rim of the breaker. After standing for 40–44 hours at room temperature the precipitate was filtered and worked up in the manner of Examples I and II above.

In working up this material two particle sizes were present. One was a fine, matted, fibrous material which sank in water and had a pale pink cast. This fraction was separated from the other which consisted of coarse, grass-seed-like particles, just prior to the 10% $H_2SO_4$–20% $Na_2SO_4$ treatment. The fine particles were labeled sample A, the coarse particles sample B.

Sample A required 40 minutes to free of hydrogen sulfide, the product was soft, white with a tinge of pink, and fibrous. It was insoluble in 3% sodium hydroxide and in 12% ammonium hydroxide. Its nitrogen content (2 tests) was 2.24% and 2.31%.

Sample B required 270 minutes for removal of the hydrogen sulfide therefrom, the product was pale yellow, semi-granular, and medium hard. Its nitrogen content (2 tests) was 2.19% and 2.14%. It was insoluble in 3% NaOH and 12% $NH_4OH$.

*Example IV*

Three hundred grams viscose prepared as in Example I, including ripening for 60 hours at 18° C., were diluted with 2400 ml. water. Dilute (0.15 N) acetic acid was added until pH 9–10. A solution of 23 grams $ZnCl_2$ in 400 ml. water was then added. A pale yellow precipitate formed at once. To the mixture was added 50 ml. aniline. The mixture was stirred 24 hours and allowed to stand 48 hours at room temperature. At the end of this time the solid residue was filtered off, washed twice with hot (70–80° C.) $H_2O$, once with hot isopropanol (60–70 C.), once more with hot water, and then treated with a solution of 10% $H_2SO_4$, 20% $Na_2SO_4$ at 50° C. until free of hydrogen sulfide. The residue was filtered, washed free of acid, washed with acetone, and air dried. The cellulose phenylthiourethane was soft, white, fibrous and contained 1.5% nitrogen. 1.0 gram dissolved readily in 20 ml. 3% NaOH at room temperature. 0.2 gram dissolved in 20 ml. 12% $NH_4OH$ at room temperature.

*Example V*

To 600 grams freshly-prepared viscose prepared as in Example I was added 8.4 ml. $CS_2$ (bringing $CS_2$ content to 60% based on weight of cellulose). This was stirred until clear, diluted with 2400 ml. water, and dilute acetic acid added until pH 9–10. A solution of 40 grams $ZnSO_4 \cdot H_2O$ in 400 ml. water was added and the whole mixture stirred 10 minutes at room temperature. Eighty ml. aniline were added, stirred 24 hours at room temperature, and allowed to stand 24 hours at room temperature. The solid residue was filtered off and worked up as described in previous examples. The product was soft, white and fibrous. It contained 1.5% nitrogen. 1.0 gram dissolved in 20 ml. 3% NaOH. It was also soluble in 12% $NH_4OH$ (0.2 gram per 20 ml.) at room temperature.

If less zinc salt than specified above for the given amount of viscose is used, the final product is colored (yellow or brown) and does not dissolve in 3% sodium hydroxide. Larger amounts of zinc sulfate are permissible but serve no useful purpose.

The process of this invention has several advantages over the prior art. It permits use of viscose normally employed in manufacture of rayon, eliminating the necessity of developing new techniques for the production and handling of a special viscose. The reaction between viscose and amine can be carried out in four hours (as compared with 24–72 hours called for by U.S. Patent No. 2,705,231). Filtration and washing of the metal cellulose xanthate prior to reaction with amine is eliminated. Substantial economic savings over U.S. 2,705,231 are effected by reducing the amount of zinc salt used in precipitation and eliminating sodium sulfate from the precipitating bath. The product is white, whereas products formed by other methods are colored (pale yellow or grey to brown). If the reaction between metal cellulose xanthate and amine is carried out at room temperature, a product is obtained which is soluble in 12% $NH_4OH$.

The foregoing specification and examples are to be considered as illustrative of the invention, not limiting. For example, while the examples all employ acetic acid to reduce the free alkali content of the viscose this does not foreclose the use of other acids for this purpose, e.g., HCl, $H_2SO_4$, formic acid, etc. Other modifications could be made by those skilled in the art without departing from the spirit of the invention.

I claim:

1. A method for the production of cellulose thiourethanes in which at least one hydrogen atom of the amido group is replaced by an organic radical comprising the steps of treating a cellulose xanthate successively with an acid and a salt of a metal selected from the group consisting of di- and tri-valent metals of groups I, II, IV, and VIII of the periodic table, and treating the resulting product with an amine selected from the group consisting of primary and secondary amines, said acid, salt and amine being added in such proportions that the pH of the reaction mixture is between about 5 and 9.

2. A method for the production of cellulose thiourethanes which comprises treating an aqueous solution of sodium cellulose xanthate containing from 35 to 100% carbon disulfide, based on the weight of the cellulose, with sufficient acid to result in a pH of about 9 to 10 in the viscose, adding to the solution an aqueous solution of a water-soluble salt of zinc to form the cellulose xanthate thereof, adding to this reaction mixture an aqueous solution of an amine selected from the group consisting of primary and secondary amines, separating the amine reaction product, and thereafter treating said reaction product with an aqueous acid medium to convert unreacted xanthate groups to hydroxyl groups.

3. A method for the production of cellulose thiourethanes which comprises treating an aqueous solution of sodium cellulose xanthate containing from 35 to 100% carbon disulfide, based on the weight of the cellulose, with sufficient acid to result in a pH of about 9 to 10 in the viscose, adding to the solution an aqueous solution of a water-soluble salt of divalent copper to form the cellulose xanthate thereof, adding to this reaction mixture an aqueous solution of an amine selected from the group consisting of primary and secondary amines, separating the amine reaction product, and thereafter treating said reaction product with an aqueous acid medium to convert unreacted xanthate groups to hydroxyl groups.

4. A method for the production of cellulose thiourethanes which comprises treating an aqueous solution of sodium cellulose xanthate containing from 35 to 100% carbon disulfide, based on the weight of the cellulose, with sufficient acid to result in a pH of about 9 to 10 in the viscose, adding to the solution an aqueous solution of a water-soluble salt of cadmium to form the cellulose xanthate thereof, adding to this reaction mixture an aqueous solution of an amine selected from the group consisting of primary and secondary amines, separating the amine reaction product, and thereafter treating said reaction product with an aqueous acid medium to convert unreacted xanthate groups to hydroxyl groups.

5. A method for the production of cellulose thiourethanes which comprises treating an aqueous solution of sodium cellulose xanthate containing from 35 to 100% carbon disulfide, based on the weight of the cellulose, with sufficient acid to result in a pH of about 9 to 10 in the viscose, adding to the solution an aqueous solution of a water-soluble salt of divalent lead to form the cellulose xanthate thereof, adding to this reaction mixture an aqueous solution of an amine selected from the group consisting of primary and secondary amines, separating the amine reaction product, and thereafter treating said reaction product with an aqueous acid medium to convert unreacted xanthate groups to hydroxyl groups.

6. A method for the production of cellulose thiourethanes which comprises treating an aqueous solution of sodium cellulose xanthate containing from 35 to 100% carbon disulfide, based on the weight of the cellulose, with sufficient acid to result in a pH of about 9 to 10 in the viscose, adding to the solution an aqueous solution of a water-soluble salt of iron to form the cellulose xanthate thereof, adding to this reaction mixture an aqueous solution of an amine selected from the group consisting of primary and secondary amines, separating the amine reaction product, and thereafter treating said reaction product with an aqueous acid medium to convert unreacted xanthate groups to hydroxyl groups.

7. A method for the production of cellulose thiourethanes which comprises treating an aqueous solution of sodium cellulose xanthate containing from 35 to 100% carbon disulfide, based on the weight of the cellulose, sufficient acid to result in a pH of about 9 to 10 in the viscose, adding to the solution an aqueous solution of a water-soluble salt of nickel to form the cellulose xanthate thereof, adding to this reaction mixture an aqueous solution of an amine selected from the group consisting of primary and secondary amines, separating the amine reaction product, and thereafter treating said reaction product with an aqueous acid medium to convert unreacted xanthate groups to hydroxyl groups.

8. A method for the production of cellulose thiourethanes which comprises treating an aqueous solution of sodium cellulose xanthate containing from 35 to 100% carbon disulfide, based on the weight of the cellulose, with sufficient acid to result in a pH of about 9 to 10 in the viscose, adding to the solution an aqueous solution of a water-soluble salt of divalent tin to form the cellulose xanthate thereof, adding to this reaction mixture an aqueous solution of an amine selected from the group consisting of primary and secondary amines, separating the amine reaction product, and thereafter treating said reaction product with an aqueous acid medium to convert unreacted xanthate groups to hydroxyl groups.

9. A method as defined in claim 2, wherein the metal salt is zinc sulfate.

10. A method as defined in claim 3, wherein the metal salt is copper sulfate.

11. A method as defined in claim 4, wherein the metal salt is cadmium sulfate.

12. In a process of preparing a spinnable cellulose thiourethane by reacting viscose with a salt of a metal selected from the group consisting of di- and tri-valent metals of groups I, II, IV, and VIII of the periodic table to convert the sodium cellulose xanthate of the viscose to a cellulose xanthate of the metal, and reacting this product with an amine selected from the group consisting of primary and secondary amines, the improvement comprising adding an acidic material to the viscose in an amount at least sufficient to reduce the pH to a pH of between about 9 to 10 prior to reacting the latter with the metal salt so as to reduce the side reaction of the metal salt with the NaOH content of the viscose.

13. Process of claim 12 wherein the metal salt is a zinc salt.

References Cited in the file of this patent

UNITED STATES PATENTS

| | | |
|---|---|---|
| 1,684,732 | Harrison | Sept. 18, 1928 |
| 1,906,910 | Lilienfeld | May 2, 1933 |
| 2,705,231 | Allewelt | Mar. 29, 1955 |